United States Patent [19]
Turchioe et al.

[11] Patent Number: 5,602,523
[45] Date of Patent: Feb. 11, 1997

[54] DEER REPELLENT SYSTEM

[76] Inventors: James Turchioe, West Air Plaza, 10 New King St., Ste. 200, White Plains, N.Y. 10604; Thomas Turchioe, P.O. Box 1068, Danville, Calif. 94526

[21] Appl. No.: 550,381

[22] Filed: Oct. 30, 1995

[51] Int. Cl.$^6$ ........................................ G08B 3/00
[52] U.S. Cl. ........................ 340/384.2; 340/384.1; 340/573; 116/22 A
[58] Field of Search .............. 340/384.2, 384.1, 340/384.3, 384.6, 426, 457.3, 573; 116/22 A

[56] References Cited

U.S. PATENT DOCUMENTS

| | | | |
|---|---|---|---|
| 4,566,085 | 1/1986 | Weinberg | 340/384.2 |
| 4,641,054 | 2/1987 | Takahata et al. | 340/384.6 |
| 4,998,091 | 3/1991 | Rezmer | 340/384.2 |
| 5,061,918 | 10/1991 | Hunter | 340/384.2 |
| 5,278,537 | 1/1994 | Carlo et al. | 340/384.1 |
| 5,418,518 | 5/1995 | Schenken et al. | 340/384.1 |

*Primary Examiner*—Jeffery Hofsass
*Assistant Examiner*—Davetta C. Woods
*Attorney, Agent, or Firm*—Alfred E. Miller

[57] ABSTRACT

An animal repelling system, especially for deer which generates a square wave signal output in the ultrasonic frequency range, and which has a piezo-electric driver utilizing a horn type device that produces harmonic distortion so that at any given time the fundamental frequency and harmonic distortion is present in the audio output, and the system is capable of frequency switching to at least 10 different frequencies.

11 Claims, 5 Drawing Sheets

DEER REPELLENT SYSTEM

The present invention relates to both a fixed and a vehicular electronic system for repelling animals such as deer.

BACKGROUND OF THE INVENTION

It is commonly known that there is increasing damage and loss caused by the rising deer population which, in search of food are migrating to populated areas. The result of this deer migration is an increase in property loss by damage caused to trees, plants and shrubs and other landscape materials surrounding homes and businesses. Thus, deer which are foraging for food wander onto private properties to eat landscaping material and such damage done by foraging deer to agriculture and forestry sections is extensive, according to reports issued by the U.S. Department of Interior Fish and Wildlife Services.

Many types of devices and methods have been and are presently being used to discourage animals, such as deer, from causing damage to landscaping material, such as perimeter fencing, which may or may not be electrified, as well as the covering of shrubs with some type of netting. These arrangements are time consuming and impair the aesthetics of the property to be protected. Furthermore, audio frequency emission systems for repelling deer presently in use are difficult to install and generally operate continuously thereby allowing deer to become accustomed to the constant audio output and thereby making the devices ineffective.

Moreover, there is a substantial hazard connected with vehicle collisions with deer due to deer crossing roads and highways, and escalating repair costs for vehicle damage as well as medical costs associated with such collisions are increasing all the time.

There is a need to provide a method or system for repelling deer that is convenient, is highly efficient and does not pose a physical risk to wildlife, pets and human beings. Prior art methods and systems for addressing these needs were either too expensive, inhumane, ineffective or a combination of all of these.

U.S. Pat. No. 5,278,537 to Carlo et al. discloses a device for generating only one frequency of electrical impulses at any one time. Although a square wave is initially generated by the device it is then converted into a sine wave with a single frequency. It also generates some frequencies in the audible range below 20 KHz which, of course, are annoying, and do not achieve our stated objective of preventing the deer from becoming accustomed to a single frequency.

U.S. Pat. No. 5,418,518 to Schenken et al. is a vehicle animal warning device in which one, or more audible tones can be produced while U.S. Pat. No. 4,566,085 to Weinberg relates to a high intensity ultrasonic generator for controlling pests and vermin by means of tone bursts which are varied to prevent the vermin or pests from becoming acclimated to the sound, however neither of these patents teach a square wave distortion in the audio output as well as frequency switching which are critical elements of the present invention.

SUMMARY OF THE INVENTION

The present system for repelling deer utilizes a frequency switching generation circuit to vary the output frequency at least ten times per second to avoid the possibility of deer becoming accustomed to a single output frequency. The output of the system is a square wave which contains a fundamental frequency plus harmonic frequencies by using a horn type piezo-electric driver which is so constructed to increase the distortion of the audio output of the system beyond that which is inherent in the square wave that is fed to the audio driver.

A further feature of the present invention uses high power, high frequency audio sound whose frequency range varies in the range of 22 KHz to 40 KHz of at least ten times per second. The audio driver is a high powered driver capable of delivering a wide angle dispersion output.

Another feature of the present invention is to provide a full perimeter coverage for the landscaping of a home or business wherein stationary units a long the full perimeter of the property interact with each of the other units resulting in full property coverage.

A further feature of the present invention is to provide optional solar and battery power to the system or arrangement thus eliminating the need to hard wire the unit to a power source. Another power option is to provide a power supply using low voltage wiring.

Another feature of the present invention allows the user to selectively use an output to be continuously on, or only when motion is detected. If the user is concerned about the deer becoming accustomed to the continuous output, then the user can select a non-continuous motion detection mode.

Another feature or object of the present invention is to provide a vehicle based system which is not passive in nature, but relying on air moving through, the the vehicle to create a high pitched sound which is typically mounted on the forward part of the vehicle. On the other hand the present invention combines a high power, high frequency audio sound generation system which continuously emits the output signal when the vehicle engine is operative. This high output audio signal delivers a narrow dispersion pattern directly in front of the vehicle.

DESCRIPTION OF THE DRAWINGS

In order that the invention may be more clearly understood, it will now be disclosed in greater detail with reference to the accompanying drawings in which.

DESCRIPTION OF THE PREFERRED EMBODIMENTS

Figure 1:
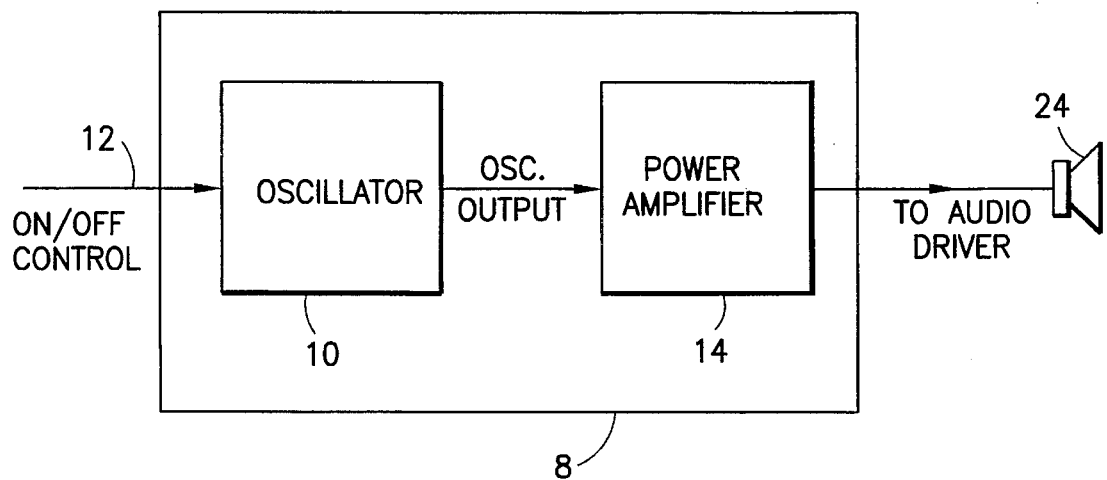
FIG. 1 is a diagrammatic view of the signal generation module in accordance with the teachings of the present invention.
Figure 1A:
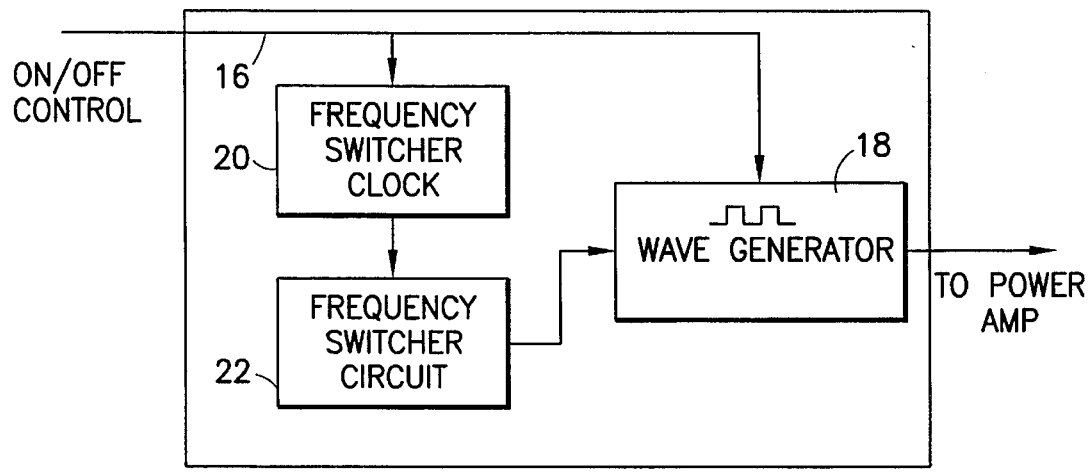
FIG. 1a is is an oscillator block diagram showing the components of the oscillator shown FIG. 1.

Referring to FIG. 1 of the drawings the arrangement and apparatus as shown is a signal generation module 8 having an oscillator which is operated by an on/off control switch 12, and the output from the oscillator goes to a power amplifier 14. The output of the power amplifier is directed to an audio driver 24. The oscillator circuit 10 is shown more specifically in FIG. 1a having an on/off control switch 16 that turns on the wave generator 18 as well the frequency switcher clock 20. The latter sends a clock signal $f_c$ to the frequency switcher circuit 22. It should be noted that the output of the frequency switcher circuit changes the frequency of the wave generator 18 based on the clock signal $f_c$.

In other words, the clock signal frequency $f_c$ determines how often the wave generator output changes it's output frequency. The wave generator 18 outputs the power amplifier 14.

Further in connection with FIG. 1, every time the clock signal $f_c$ changes state the frequency switcher circuit 22 changes the wave generator output to one of 10 or 12 different frequencies. It should be understood that the number of frequencies presently generated is only by way of example and that an increased number of frequencies can be develop within the principles of the present invention. Thus, the different frequencies and the stepping of the system results in effectively repelling deer.

Figure 4:
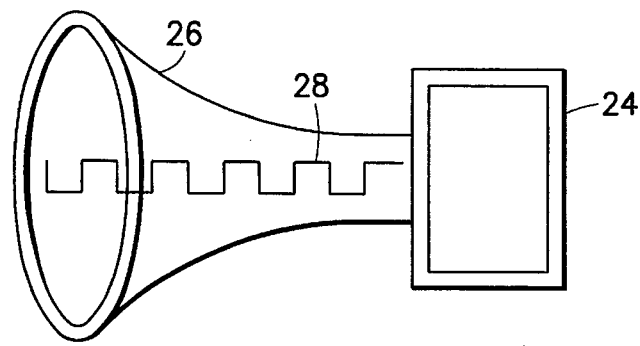
FIG. 4 is a cross-sectional view of a horn driver for providing the square wave distortion required in practicing the present invention.

It should be noted that the wave generator 18 outputs a square wave which is fed to the power amplifier 14 for amplification, as seen in FIGS. 1 and 4. The power amplifier delivers a high output in order to obtain a coverage/range necessary to be effective as a deer repellent. Consequently, the output of FIG. 1, which is the signal generation module, is fed to the audio driver which produces the proper ultrasonic sound energy. As seen in FIG. 1 and 4, the audio driver 24 is a piezo-electric driver and is a horn type device as shown in FIG. 4 which delivers high frequency audio sound whose frequencies vary in the range of 22 KHz to 40 KHz at least ten times per second. Furthermore, the audio driver 24 is of such a construction that, it delivers a wide angle dispersion output. As seen in FIG. 4, piezo-electric driver 24 is provided with a horn 26 that has a throat portion 28 which produces intermodulation and harmonic distortion. This type of distortion is caused by the non-linear compression of air in the throat of the horn. The distortion increases as the frequency and throat depth increases. It should be also be noted that the harmonic distortion is proportional to the number of wavelengths passing through the throat 28. The harmonic distortion present in the audio output in the present apparatus is at least 17%. It should be further stated that this increasing of distortion of the audio output of the system, above that inherent in a square wave, is then fed to the audio driver 24.

Figure 2:
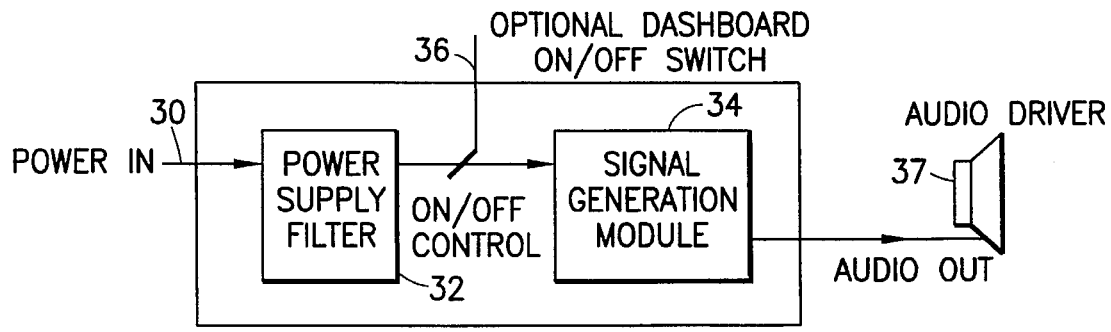
FIG. 2 is a diagrammatic view of the vehicle mounted unit for repelling deer on the road or highway.
Figure 3:
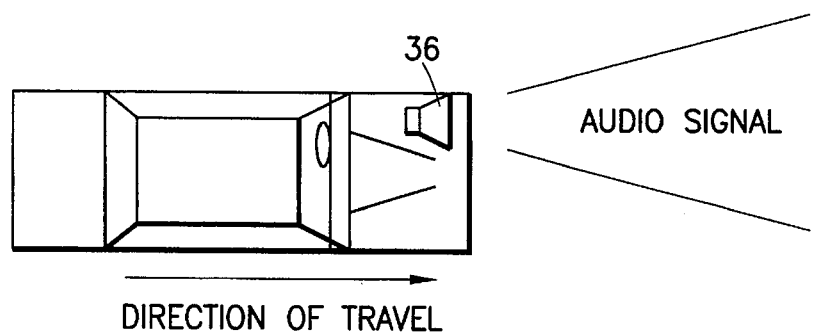
FIG. 3 is a schematic view of a typical installation of the present invention on any form of a vehicle unit.

Referring now to FIGS. 2 and 3, a vehicle mounted deer repellent system is shown in which an audio output is generated from power source 30 from the automotive vehicle electrical system which is filtered by the power supply filter 32 in order to prevent damage to the signal generation module 34.

The power source can be controlled, if desired, from an optional switch 36 which may be mounted in the passenger compartment of a vehicle. The output of the signal generation module is fed to the audio driver 37, and as seen in FIG. 3 the audio driver 37 is typically mounted behind the front grille of a vehicle and points in a forward direction. The audio driver 37 is also constructed of the piezo-electric type, which was described hereinbefore in connection with the stationary units. Thus, the high output audio signal vehicle unit utilizes a high powered driver which delivers a narrow dispersion pattern in front of the vehicle, and which covers the road directly in front of the vehicle.

Figure 5:
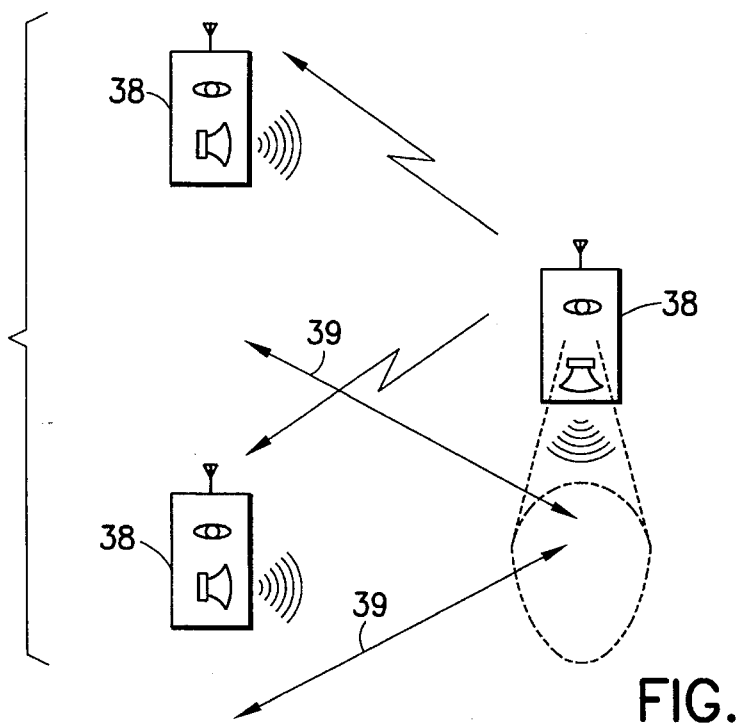
FIG. 5 is a block diagram of the stationary unit of the deer repelling system.
Figure 8:
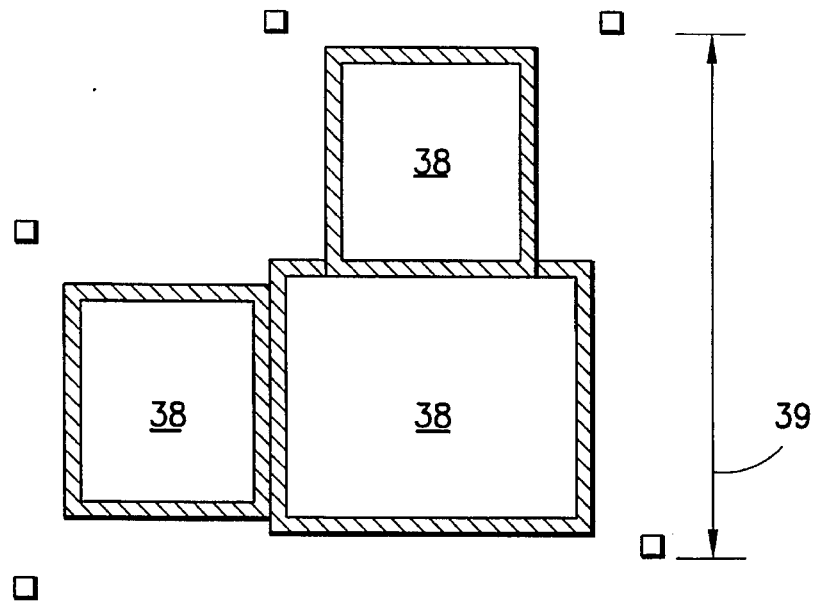
FIG. 8 is a stationary unit typical modular layout for full perimeter coverage of the present deer repelling system.

FIG. 5 shows a multiple stationary system for repelling deer in which each unit 38 is separated by 120 feet in order to cover the protected perimeter. It should be noted that when stationary modules are arranged for perimeter coverage, the maximum distance between each module is approximately 120 feet, due to the nominal range of the transmitter, as particularly seen in FIG. 8.

Figure 6:
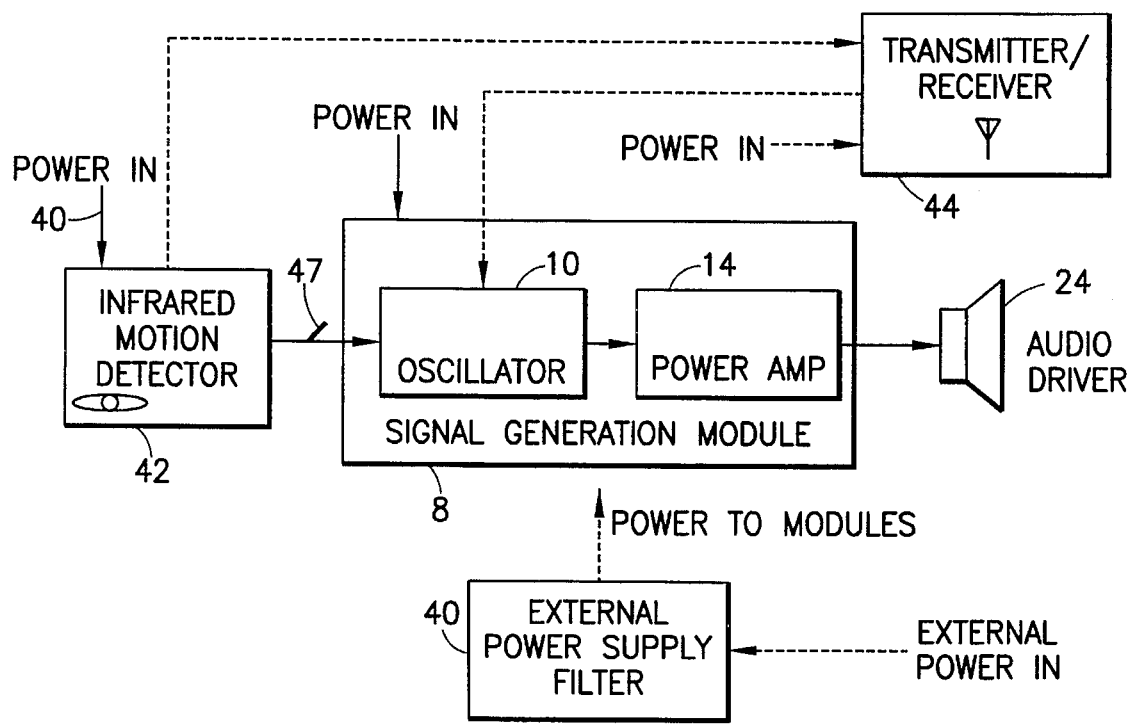
FIG. 6 is a stationary unit module block diagram showing the external power arrangement for the present invention.
Figure 7:
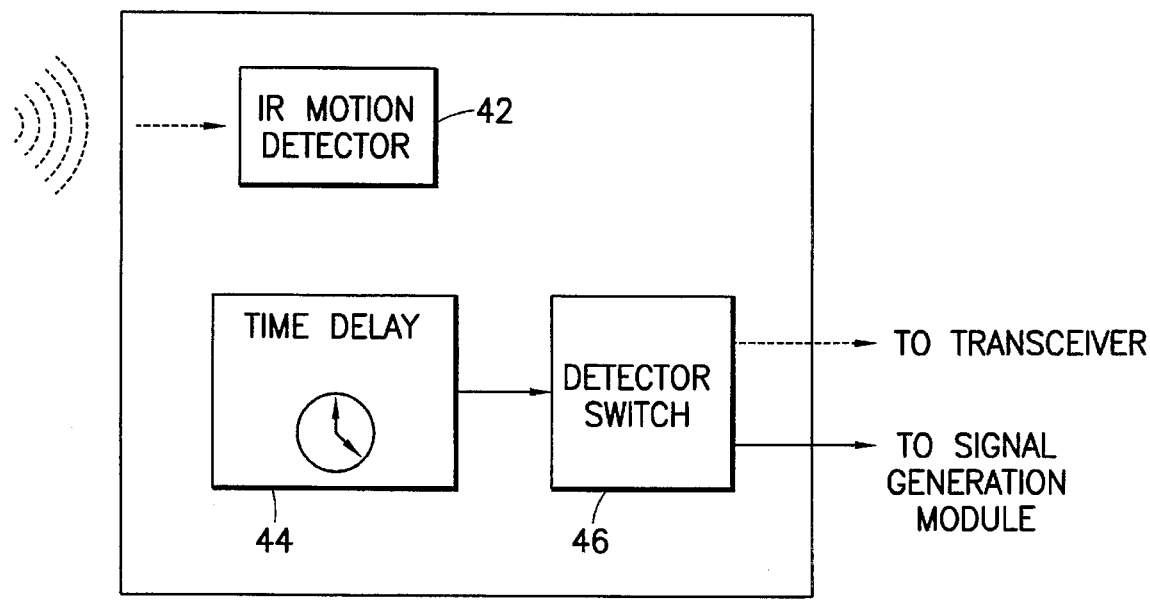
FIG. 7 is a stationary unit detector block diagram.

FIG. 6 shows the primary components of each stationary unit. In this regard, the power source 40 activates a motion detector 42, and as also seen in FIG. 7. The motion signal is delayed by a time delay circuit 44, as seen in FIG. 7, in order to minimize the false triggering of any signal generation module. If the motion signal is still present after the preselected time delay period has expired, detector switch 46 is activated to energize the signal generation module 8 and optional transceiver 44. If it is necessary to have continuous operation the signal will be generated continuously independent of detected motion. This is accomplished through an optional switch 6. The output of the signal generation module 8 is fed to the audio driver 24 when one of the stationary units is configured for perimeter coverage and the signal generation module can also be keyed by the transceiver 44 as a result of a neighboring stationary unit detection.

Figure 6A:
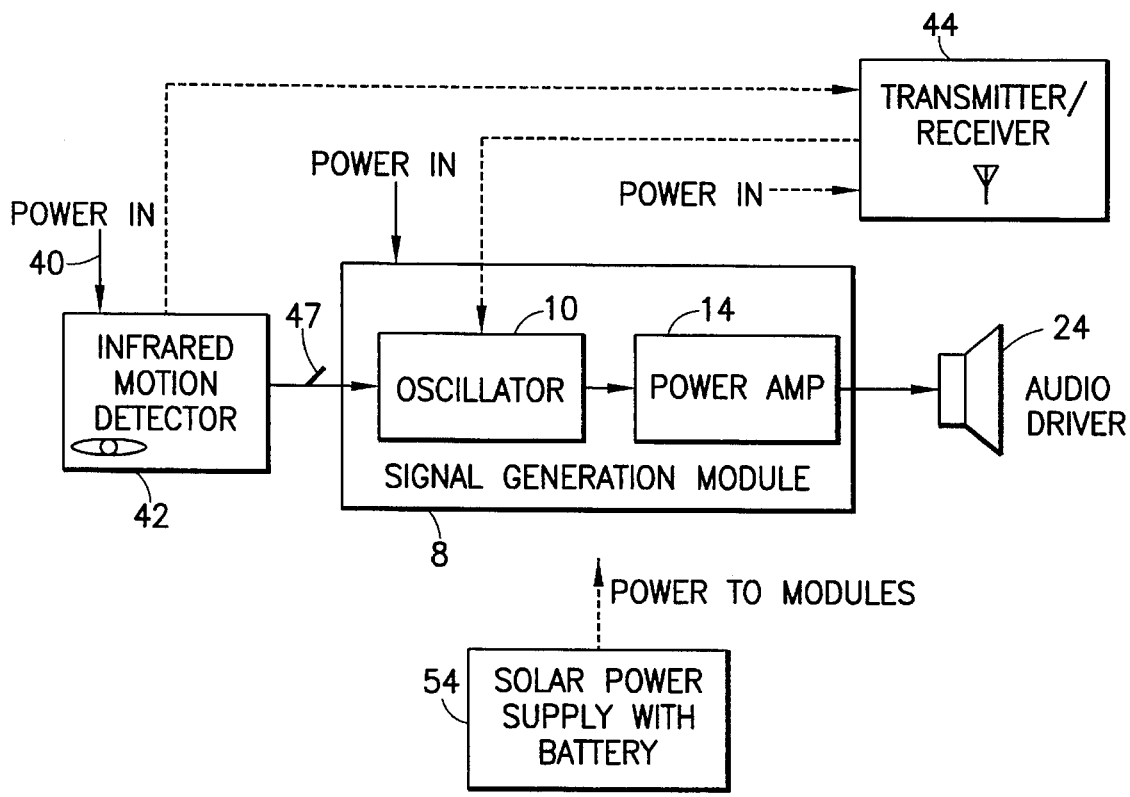
FIG. 6a is a block diagram similar to that shown in FIG. 6 but showing a free standing operation utilizing a solar power supply with a battery instead of the external power source.

FIG. 6a is identical with showing of the primary components of the stationary unit illustrated in FIG. 6 with the exception that the power source or power supply is not external but is self-contained, in the form of solar power supply 54.

Figure 9:
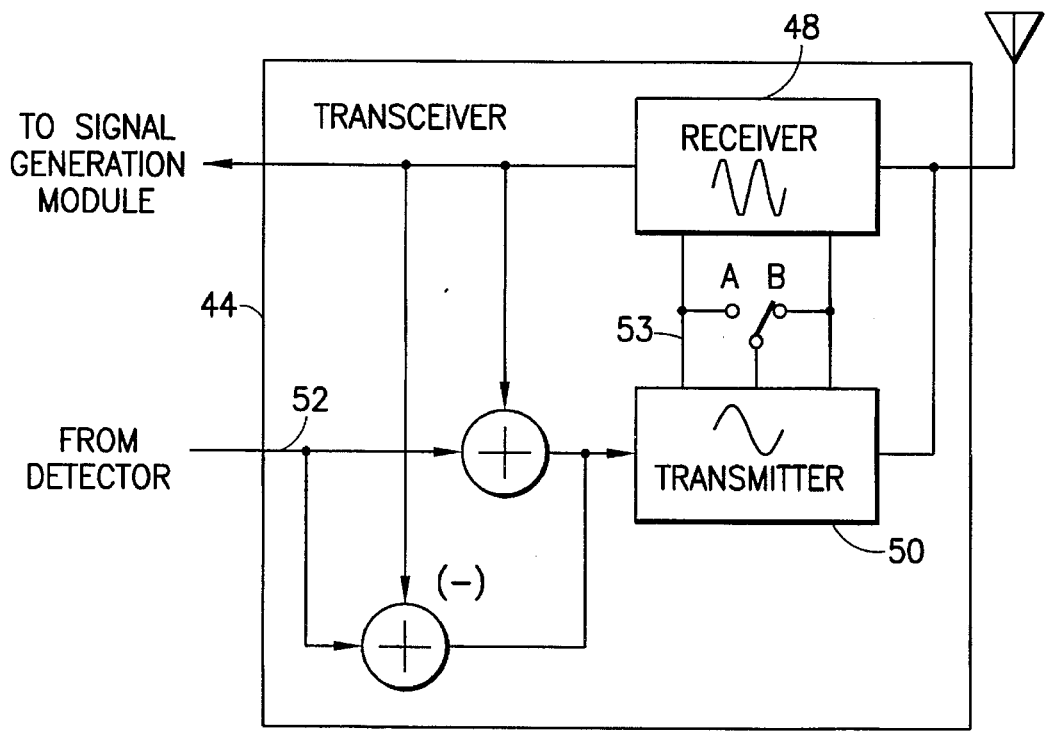
FIG. 9 is a stationary unit transceiver block diagram with selectable transmit receive frequency setting for use in the multi-unit perimeter coverage arrangement and FIG. 10 is a stationary unit transmitter/receiver frequency arrangement for full perimeter coverage.
Figure 10:
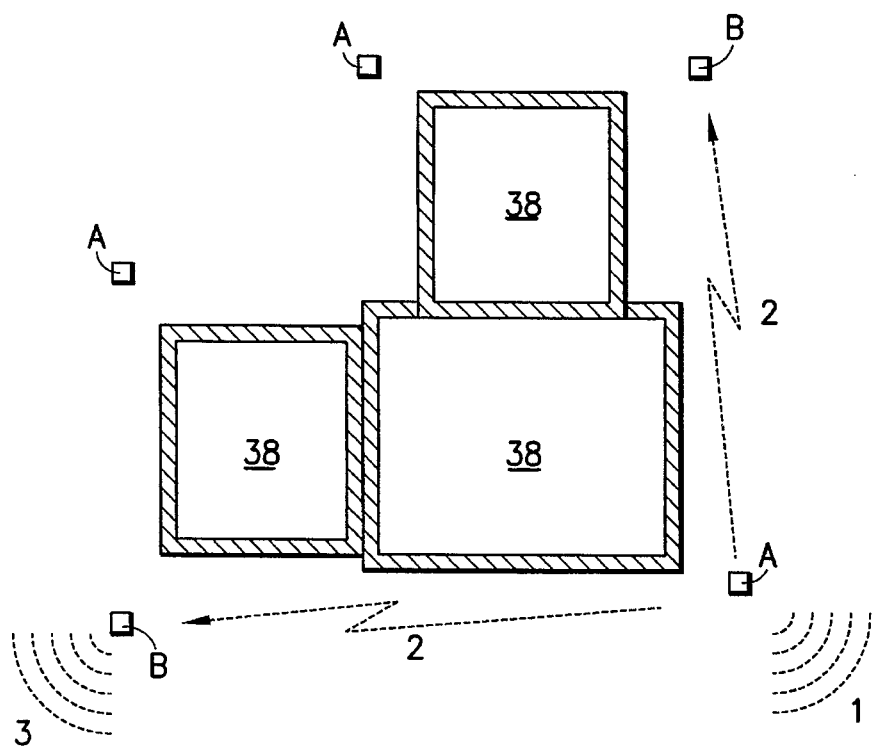

Referring now to FIG. 9, the stationary unit transceiver block diagram is shown with the selectable transmit/receive frequency which determines the transmit and receive frequency for the multi-unit perimeter coverage. The transceiver 44 comprises a receiver 46, a transmitter 50, and logic circuits 52, as well as a frequency select switch 53. Thus, when the local unit receiver shown in FIG. 9 receives the remote module signal, the local oscillator is keyed and produces high frequency sound energy from it's audio driver. Thus, the logic circuits shown in FIG. 9 enable the local transmitter to be activated under two conditions: (1) when motion is detected by a local unit or (2) when motion is detected by both the local and remote units. As a result, each module frequency select switch must be alternately set to positions A and B, as illustrated in FIG. 10. This arrangement reduces energy consumption by avoiding activation of units not located in the area of motion. Thus, a motion detector in one unit triggers adjacent modules only, and this results in full perimeter coverage in the present repellant arrangement.

The present arrangement or apparatus is highly effective because of square wave distortion and frequency switching which avoids the possibility of deer becoming accustomed to a single output frequency. The present system output contains a number of frequencies at any one time which is confusing and repelling to deer that approach protected land, as well as repelling deer from highways when the vehicle mounted unit is used.

Although the present invention has been disclosed and described with reference to certain embodiments thereof, it should be noted that other variations and modifications may be made, and it is intended that the following claims cover said variations and modifications within the true spirit of the invention.

What we claim is:

1. An animal repelling apparatus operative in the ultrasonic frequency range comprising: a motion detector, a signal generation module including an oscillator, said oscillator having a power source and including a frequency switcher clock, a frequency switcher circuit and a wave generator, said wave generator outputting solely a square wave, said clock sending a clock signal to said frequency switcher circuit which determines how often said wave generator changes it's output frequency, a power amplifier receiving the square wave signal generated from said oscillator, and a piezo-electric audio driver for receiving said square wave signal which is projected in the form of ultrasonic sound waves of fundamental frequency plus harmonic frequencies, said audio driver being a horn-type device having a throat portion the depth of which is configured beyond that inherent in the square wave that is fed to the audio driver, said wave being dispersed in a pattern to repel animals entering the area who have been detected by said motion detector.

2. A stationary unit animal repelling apparatus operative in the ultrasonic frequency range comprising: an external power source having a power supply filter, a motion detector, a signal generation module including an oscillator and a power amplifier, said oscillator including a frequency switcher circuit, a frequency switcher clock and a wave generator, said wave generator outputting a square wave, said clock sending a clock signal to said frequency switcher circuit which determines how often said wave generator changes it's output frequency, said power amplifier receiving the square wave signal generated from said oscillator, and a piezo-electric audio driver for receiving said square wave signal from said amplifier which is projected in a pattern to repel animals who have been detected by said motion detector.

3. An animal repelling apparatus as claimed in claim 2 wherein said frequency switcher circuit changes the wave generator to one of ten selectable different frequencies.

4. An animal repelling apparatus as claimed in claim 2 wherein said ultrasonic sound waves generated by said apparatus is in the frequency range of 22 KHz to 40 KHz.

5. A stationary unit animal repelling apparatus as claimed in claim 2 wherein said detector is an infrared motion detector.

6. An animal repelling apparatus as claimed in claim 1 wherein said power source is a solar power supply with a battery.

7. A stationary unit animal repelling apparatus as claimed in claim 2 further comprising a time delay circuit operatively connected to minimize false triggering of said signal generation module.

8. A stationary unit animal repelling apparatus as claimed in claim 2 further comprising a transmitter/receiver for said apparatus and for additional stationary units so placed as to form a perimeter protecting a land area whereby said units are no more than 120 feet from an adjacent unit and wherein motion detected by one unit will activate adjacent units.

9. An animal repelling apparatus as claimed in claim 1 wherein there is at least 17% harmonic distortion in the audio output of the apparatus.

10. A stationary unit animal repelling apparatus as claimed in claim 2 wherein said piezo-electric audio driver is a horn having a throat portion configured to produce harmonic distortion in the audio output of at least 17%.

11. An animal repelling device as claimed in claim 10 wherein said throat portion has a preselected depth that increases the harmonic distortion produced by said horn when the frequency of the driver is increased.

* * * * *